United States Patent
Mohammed et al.

(10) Patent No.: US 12,206,664 B2
(45) Date of Patent: Jan. 21, 2025

(54) SECURITY PROFILE SELECTION AND CONFIGURATION OF NETWORK DEVICES VIA OWNERSHIP VOUCHER EXTENSION

(71) Applicant: Cisco Technology, Inc., San Jose, CA (US)

(72) Inventors: Jabir Hamediya Mohammed, Bangalore (IN); Reda Haddad, San Jose, CA (US); Srihari Raghavan, Chennai (IN); Sandesh K. Rao, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 320 days.

(21) Appl. No.: 17/745,417

(22) Filed: May 16, 2022

(65) Prior Publication Data

US 2023/0370454 A1      Nov. 16, 2023

(51) Int. Cl.
*G06F 21/00* (2013.01)
*H04L 9/40* (2022.01)

(52) U.S. Cl.
CPC ........ *H04L 63/0876* (2013.01); *H04L 63/102* (2013.01); *H04L 63/20* (2013.01)

(58) Field of Classification Search
CPC .... H04L 63/0876; H04L 63/102; H04L 63/20
See application file for complete search history.

(56) References Cited

U.S. PATENT DOCUMENTS

| | | | |
|---|---|---|---|
| 2006/0143700 A1* | 6/2006 | Herrmann | H04L 63/166 726/14 |
| 2017/0168859 A1 | 6/2017 | Watsen | |
| 2018/0278587 A1 | 9/2018 | Daskalopoulos et al. | |
| 2019/0274049 A1 | 9/2019 | Lee et al. | |
| 2020/0186365 A1 | 6/2020 | Kumar et al. | |
| 2020/0327231 A1* | 10/2020 | Smith | G06F 21/33 |
| 2021/0352110 A1* | 11/2021 | Huffman | H04L 63/02 |
| 2021/0367839 A1* | 11/2021 | Vanderveen | H04L 41/0894 |
| 2022/0303123 A1* | 9/2022 | Cabre | G06F 21/575 |
| 2023/0229778 A1* | 7/2023 | Terpstra | H04L 9/3247 713/2 |

FOREIGN PATENT DOCUMENTS

WO      WO2019147311      8/2019

OTHER PUBLICATIONS

"Secure Zero Touch Provisioning (SZTP)", RFC 8572, Apr. 1 (Year: 2019).*

* cited by examiner

*Primary Examiner* — Michael M Lee
(74) *Attorney, Agent, or Firm* — Lee & Hayes, P.C.

(57) ABSTRACT

Techniques and architecture are described for providing a configurable security posture for a network device using an extended ownership artifact, e.g., an ownership voucher, an ownership certificate, etc., and a security profile mechanism that scales to user needs and desires for security profiles on network devices, i.e., easily and securely customizable on thousands of nodes of a network. The configurable security posture may be achieved using the manufacturer authorized signing authority (MASA) to issue an ownership voucher with a security bit extension to support security profile additions. Using the MASA service, a user may explicitly decide on various security postures of a given network device and may apply that profile across the fixed or modular chassis of a network of network devices.

20 Claims, 5 Drawing Sheets

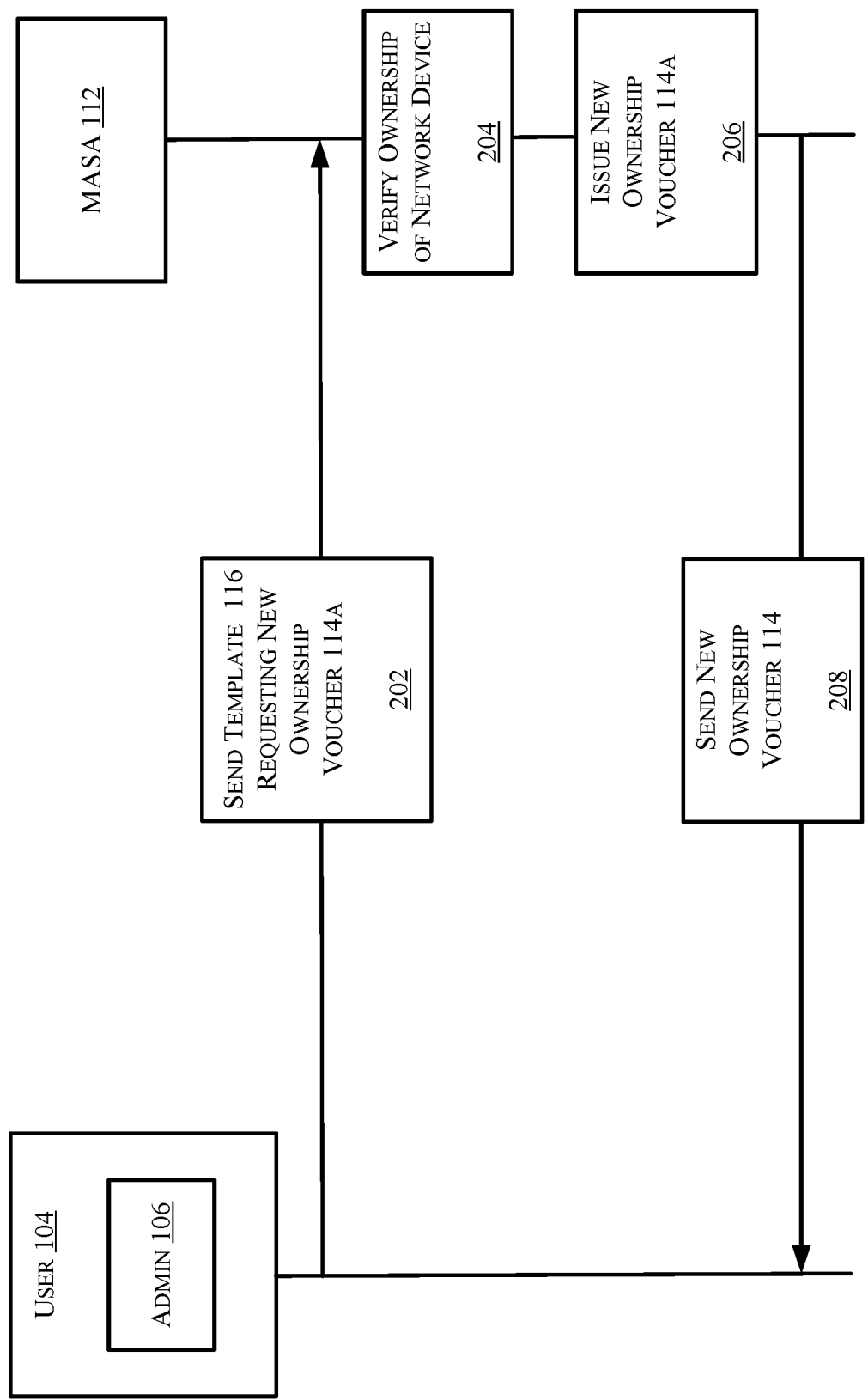

300 ↘

```
┌─────────────────────────────────────────────────────────────────────┐
│  PROVIDE, TO A USER, A FIRST OWNERSHIP ARTIFACT FOR A NETWORK DEVICE, │
│  WHEREIN THE FIRST OWNERSHIP ARTIFACT INCLUDES FIRST SECURITY PROFILE │
│  SELECTION BIT STRING EXTENSION, AND WHEREIN THE FIRST SECURITY PROFILE│
│  SELECTION BIT STRING EXTENSION IS CONFIGURED TO CONFIGURE THE NETWORK │
│              DEVICE ACCORDING TO A FIRST SECURITY PROFILE              │
│                                                                        │
│                                  302                                   │
└─────────────────────────────────────────────────────────────────────┘
                                   ↓
┌─────────────────────────────────────────────────────────────────────┐
│  RECEIVE, FROM THE USER, A REQUEST FOR A SECOND OWNERSHIP ARTIFACT,    │
│  WHEREIN THE REQUEST INCLUDES A REQUEST FOR A SECOND SECURITY PROFILE  │
│  SELECTION BIT STRING EXTENSION WITHIN THE SECOND OWNERSHIP ARTIFACT   │
│                                                                        │
│                                  304                                   │
└─────────────────────────────────────────────────────────────────────┘
                                   ↓
┌─────────────────────────────────────────────────────────────────────┐
│  PROVIDE THE SECOND OWNERSHIP ARTIFACT TO THE USER, WHEREIN THE SECOND │
│  OWNERSHIP ARTIFACT COMPRISES THE SECOND SECURITY PROFILE SELECTION BIT│
│  STRING EXTENSION, AND WHEREIN THE SECOND SECURITY PROFILE SELECTION BIT│
│     STRING EXTENSION IS CONFIGURED TO CONFIGURE THE NETWORK DEVICE     │
│                   ACCORDING TO A SECOND SECURITY PROFILE               │
│                                                                        │
│                                  306                                   │
└─────────────────────────────────────────────────────────────────────┘
```

FIG. 3

SECURITY PROFILE SELECTION AND CONFIGURATION OF NETWORK DEVICES VIA OWNERSHIP VOUCHER EXTENSION

TECHNICAL FIELD

The present disclosure relates generally to setting security profiles of network device using an ownership voucher, and in particular to selecting and configuring security profiles of network devices using a bit string extension within an ownership voucher.

BACKGROUND

Recently, original equipment manufacturers (OEMs) of network devices such as, for example, routers, switches, etc., have encountered various users with contradicting requirements for security profiles that require the OEMs to ship the same product stock keeping unit (SKU) with different security profiles, e.g., for a security knob (e.g., bit) that is classic zero touch provisioning (ZTP) vs. secure ZTP. In addition, sometimes users have different operational teams or business units within their organizations that require different security profiles. Likewise, different geographical regions such as, for example, countries, states, provinces, cities, counties, etc., may have different requirements that require different security profiles for network devices. Furthermore, as users adopt different security measures, some of the security knobs need to change over time. This results in a multitude of security knobs that need to be handled at manufacturing and sometimes need to be changed securely due to reliability, maintainability, and availability (RMA) requirements, change in user mindset, etc.

Additionally, the OEMs often do not know who the end user of their network devices is going to be. For example, OEMs may provide their network devices to a first partner, who may provide the network devices on to the end user. There are also situations where the first partner may provide the network devices on to a second partner, who then provides the network devices to the end users, and so forth.

Accordingly, it is difficult for the OEMs to ship their network devices such that the end user is able to tailor their security profile within the network devices without coming back to the OEMs with a roundtrip consent token or a roundtrip security exchange, for example, so that software within the network device or a bit within the hardware of the network device may be changed to suit the user's security profile within the network devices. Indeed, if the security profile needs to be changed within the network devices, then the security knobs that need to be changed may number upwards of a thousand and such security knobs currently need to be changed manually, one by one, with interaction between engineers or technicians at the user and the appropriate OEM.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2A schematically illustrates an example flow between an admin of a user and a manufacturer authorized signing authority (MASA) for obtaining a new ownership voucher for a network device.

FIG. 3 illustrates a flow diagram of an example method for selecting and configuring security profiles of network devices using a bit string extension within an ownership artifact.

DESCRIPTION OF EXAMPLE EMBODIMENTS

Overview

Figure 1:
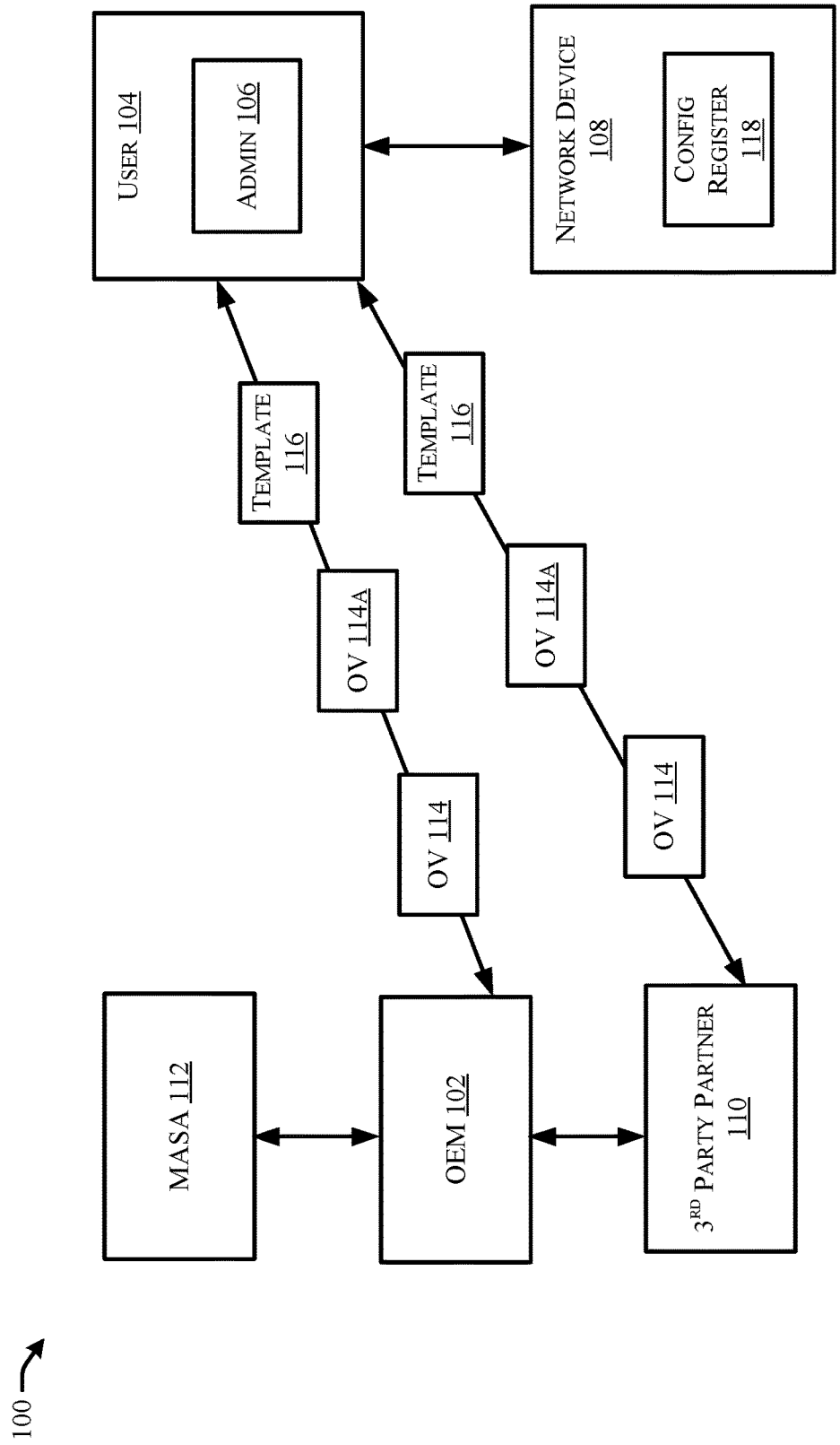
FIG. 1 schematically illustrates an example arrangement of a network device original equipment manufacturer (OEM) and a user utilizing ownership vouchers to set security profiles in network devices.

The present disclosure describes techniques and architecture that utilize extensions of the standards-based ownership voucher (OV) mechanism (bit-field extensions) in order to create a "securely configurable" security posture for a network device (with some initial security posturing at manufacturing). The techniques and architecture also allow for user flexibility to change the security posture, e.g., downgrading or elevating of the security posture.

In particular, a configurable security posture may be provided for a network device using an extended ownership artifact, e.g., an ownership voucher, an ownership certificate, etc., and a security profile mechanism is described herein that scales to user needs and desires for security profiles on network devices, i.e., easily and securely customizable on thousands of nodes of a network. This further facilitates the OEM's manufacturing team cutting costs, reducing efforts on collecting and configuring the security profiles on network devices on a per user basis, and tying the security profile to a given network device during the manufacturing workflow of the network device itself.

In configurations, the configurable security posture may be achieved using the manufacturer authorized signing authority (MASA) to issue an ownership voucher with the security bit extension to support security profile additions. Using the MASA service, a user may explicitly decide on various security postures of a given network device and may apply that profile across the fixed or modular chassis of a network of devices. In configurations, the MASA is part of the OEM and executed on one or more servers of the OEM.

As an example, the following security knobs, e.g., bits relating to device security configuration, may be supported, as per user discussions as well as their contradicting requirements, through use of the security profile and ownership voucher extensions as described herein. This list is not meant to be exhaustive: it is merely an example. Furthermore, non-security knobs may also be affected and/or altered using the techniques described herein using the ownership voucher, even though such non-security knobs are not listed.

Zero Touch Provisioning or Secure Zero Touch Provisioning.
Enabling/Disabling signed Third-party RPMs.
Ownership transfer for the device is allowed or not.
Enable Anti-theft Feature.
IMA disablement for Thirty-party application.
IMA logging for Third-party application.
SE-Linux policy enforcement for third-party application.

Only allow secure protocols for control plane management.

Config PCR extend feature.

User mode Enable.

FIPS mode enable.

Disable disk encryption.

Disk encryption composite.

Trusted path Routing enables.

Enable unmediated transfer.

Enable mediated transfer.

TPMControl.

implicit attestation support.

Thus, in configurations, an OEM may initially know a security profile for a particular user for the particular user's network devices. The OEM may then manufacture network devices for the particular user with the network devices being configured according to the known security profile for the particular user. However, when a user receives a network device from a partner of an OEM rather than the OEM itself, the user may obtain an ownership voucher from the partner. In configurations, the ownership voucher is issued by the OEM via the MASA. The user may then wish to configure the network device with a desired security profile. The user may submit a template requesting a new ownership voucher. The template may be provided to the OEM or may be provided to the partner, which then provides the template to the OEM.

The partner or the OEM may then verify with the MASA that the user owns the network device based on, for example, the serial number of the network device. A new ownership voucher that includes the appropriate security knobs based on the known security profile may then be issued by the OEM via the MASA to the user for the network device that enables and configures the network device according to the known security profile of the user. In configurations, the new ownership voucher may be obtained through the partner. Otherwise, as previously noted, the security knobs within the security profile may need to be manually changed, where such security knobs may number in upwards of a thousand security knobs. Additionally, in configurations, non-security knobs may also need to be altered. As noted, the ownership of the network device may be verified through the MASA mechanism indicating that the user does indeed own the network device. The request to verify the ownership may include the request for the new security profile.

In configurations, the template for requesting a new ownership voucher that alters one or more security knobs, e.g., bits, of a network device, may simply request altering one or more affected security knobs and any unaffected security knobs may not to be listed as such unaffected security knobs may remain at a current value and/or default value. Alternatively, in configurations, each security knob or bit, whether affected or not, may need to be listed within the template with the appropriate value, e.g., a changed value or a current and/or default value.

Accordingly, the techniques and architecture described herein allow for the patching of all security knobs at one time in a network device rather than changing the security knobs one-by-one for each bit of the network device. Additionally, as previously noted, users may have different security profiles for different business units and/or different operational teams, e.g., different deployment requirements for network devices based on the business units and/or operational teams. The techniques described herein allow for different customizations for configurations of network devices that allow for such customizations to be made more quickly and efficiently.

As an example, a method may include providing, to a user, a first ownership artifact for a network device, wherein the first ownership artifact includes first security profile selection bit string extension, and wherein the first security profile selection bit string extension is configured to configure the network device according to a first security profile. The method may further include receiving, from the user, a request for a second ownership artifact, wherein the request includes a request for a second security profile selection bit string extension within the second ownership artifact. The method may also include providing the second ownership artifact to the user, wherein the second ownership artifact comprises the second security profile selection bit string extension, and wherein the second security profile selection bit string extension is configured to configure the network device according to a second security profile.

In configurations, the request may include the first ownership artifact. In some configurations, the method may further include based at least in part on the first ownership artifact, verifying, via a manufacturer authorized signing authority (MASA) mechanism, ownership by the user of the network device.

In configurations, the request may list only values of bits of the second security profile selection bit string extension that need to be changed to configure the network device according to the second security profile. In other configurations, the request may list (i) values of bits of the second security profile selection bit string extension that need to be changed to configure the network device according to the second security profile and (ii) current values of bits of the first security profile selection bit string extension that are to remain unchanged to configure the network device according to the second security profile.

In configurations, the request may include a request for a non-security profile selection bit string extension within the second ownership artifact. In configurations, the request for the second ownership artifact is signed by the user using the first ownership artifact. In some configurations, the MASA mechanism may be part of an original equipment manufacturer (OEM) that manufactured the network device.

In configurations, the request for the second ownership artifact may be based at least in part on one or more of (i) a change of ownership of the network device, (ii) different security requirements for different operational teams or business units within the user, (iii) different security requirements for different geographical regions, or (iv) new security requirements for the user The techniques described herein may be performed by a system and/or device having non-transitory computer-readable media storing computer-executable instructions that, when executed by one or more processors, performs the method described above.

Example Embodiments

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates an example arrangement 100 of a network device original equipment manufacturer (OEM) 102 and a user 104 utilizing ownership vouchers to set security profiles in network devices. The user may be, for example, an individual, an organization, a business, a school, etc. The user 104 includes an administrator 106 and one or more network device(s) 108 for use within a network (not illustrated). Generally, as is known, the network of the user 104 includes many network devices 108, e.g., hundreds, thousands, or more. The OEM 102 manufactures network devices 108, e.g., routers, switches, etc. The OEM 102 may provide network devices 108 to the user 104.

The example arrangement 100 also includes a third party partner or vendor 110 and a manufacturer authorized signing authority (MASA) 112, which in configurations may be executed on a server (not shown) and/or may be part of the OEM 102. In configurations, the third party partner 110 may obtain network devices 108 from the OEM 102 and provide them to the user 104.

As previously noted, the OEM 102 may initially know a security profile for a the user 104 for the user's network devices 108. The OEM 102 may then manufacture network devices 108 for the the user 104 with the network devices 108 being configured according to the known security profile for the user 104. When the OEM 102 provides the network device 108, the OEM 102 also provides an ownership voucher (OV) 114 (also known as an ownership certificate) with the network device 108 to the user 104. The ownership of the network device 108 is registered with the MASA 112 based at least in part on the serial number of the network device 108.

However, when the user 104 receives a network device 108 from a partner of the OEM 102, e.g., the 3$^{rd}$ party partner 110, rather than the OEM 102 itself, the user 104 may obtain the ownership voucher 114 with the network device 108 from the 3$^{rd}$ party partner 110. In configurations, the ownership voucher 114 is provided by the OEM 102 to the 3$^{rd}$ party partner and the network device 108 is registered as owned by the user 104 with the MASA 112 based at least on the serial number of the network device 108. The network device 108 may thus have an incorrect security profile since the 3$^{rd}$ party partner may have obtained the network device 108 from the OEM 102 without knowing who the ultimate user 104 was going to be.

In configurations, the user 104 may request a new ownership voucher 114a that includes a bit string extension (as described herein) for security knobs of the network device 108 that configures the network device 108 with a desired security profile. The request may be in the form of a template 116 that includes the ownership voucher 114 and may be sent to the 3$^{rd}$ party partner 110, which may forward it to the OEM 102 or the MASA 112. Alternatively, the template 116 may be forwarded to the OEM 102, which may forward it to the MASA 112, or the user 104 may forward the template 116 to the MASA 112. The 3$^{rd}$ party partner 110 or the OEM 102 may verify that the user 104 owns the network device 108 based on the serial number of the network device 108 within the ownership voucher 114 and the MASA 112.

A new ownership voucher 114a that includes the appropriate security knobs in a bit string extension based on the known security profile of the user 104 may then be issued by the MASA 112 or the OEM 102 to the user 104 for the network device 108. The new ownership voucher 114a enables and configures the network device 108 according to the known security profile of the user 104. In configurations, the new ownership voucher 114a may be obtained by the user 104 through the 3$^{rd}$ party partner 110, or from the OEM 102 or the MASA 112. Otherwise, as previously noted, the security knobs within the security profile may need to be manually changed on the network device 108, where such security knobs may number in upwards of a thousand security knobs. Additionally, non-security knobs may also need to be altered. As noted, the ownership of the network device 108 may be verified through the MASA 112 indicating that the user 104 does indeed own the network device 108. The request to verify the ownership may include the request for the new security profile.

In particular, the ownership voucher 114 (and subsequently, if needed, the ownership voucher 114a) is used to securely identify the network device's owner, e.g., the user 104, as it is known to the OEM 102. The ownership voucher 114 is signed by the OEM 102. The ownership voucher 114 is per the Request for Comments (RFC) 8572, section-3.3. An example of the ownership voucher in the form of the ietf-voucher may be as shown below per rfc8366:

```
module: ietf-voucher
  yang-data voucher-artifact:
    +---- voucher
       +---- created-on                          yang: date-and-time
       +---- expires-on?                         yang: date-and-time
       +---- assertion                           enumeration
       +---- serial-number                       string
       +---- idevid-issuer?                      binary
       +---- pinned-domain-cert                  binary
       +---- domain-cert-revocation-checks?      Boolean
       +---- nonce?                              binary
       +---- last-renewal-date?                  yang: date-and-time
```

In configurations, the ownership voucher 114 includes a security profile selection bit string. e.g., a bit string extension, which may be represented, for example, as below. The bit string extension may be extended for other purposes as well. e.g., a non-security profile bit string. Many of the security options to select may be conveyed via the bit string when the user is communicating with the OEM 102, the 3$^{rd}$ party partner 110, and/or the MASA 112 using the current ownership voucher 114 and requesting a new ownership voucher 114a to adjust the security profile of the network device 108. Many of the security options to select may be conveyed via the bit string by the OEM 102 and/or the MASA 112 when issuing the original ownership voucher 114.

The MASA 112 or the OEM 102 may create a security profile based on the security profile bit string in the ownership voucher 114. The MASA 112 and/or the OEM 102 may then issue a new ownership voucher 114a with the respective bit string activated. This functionality gives flexibility to the user admin 106 to control the security posture of a given network device 108e before its been deployed in the field, e.g., the network. With the product identification (PID), serial number (SN) and other fields that are included as standard in ownership vouchers, one can control the security posture per network device 108. An example of a Security ProfileSelector bit string is detailed below:

Security Profile:: "Generic" or "Custom"
    SecurityProfileSelector:: =BIT STRING
       {SignedThirdpartyRPM (0),
       Ownership TransferEnable (1),
       EnableAnti Theft (2),
       IMAThird-party Disable (3),
       IMA Third-party Logging (4),
       SE-LinuxPolicy Enforce (5),
       AllowOnlySecureProtocol (6),
       ConfigPCRExtend (7),
       CustomModeEnable (8),
       EnableFipsMode (9),
       DisableDiskEncryption (10), DiskEcnryptionComposite (11),
TrustedPathRoutineEnable (12),
EnableUnMediatedTransfer (13),
EnableMediatedTransfer (14),
TPMControl (15),
ImplicitAttestationEnable (16)}

The ownership vouchers 114, 114*a* are signed artifacts and thus, the above SecurityProfileSelector bit string is protected with the OEM's digital signature signed by the ownership OEM's key.

Note that, the configuration (security profile) that was received and verified through the ownership voucher 114 may be stored as an admin object in a trusted application manager (TAM) (for example as a bit mask) of the network device 108 or may be in a different dedicated register. Below is an example TAM Register:

FlipsModeEnable CustomModeEnable ConfigPCRExtend AllowOnlySecureProtocol
SE-LinuxPolicyEnforce IMA Third-partyLogging IMAThird-party Disable EnableAnti-Theft
OwnershipTransferEnable SignedThird-partyRPM SecureConfigRegister in TPM Others Note that a network device's security profile may be standardized via RFC, which facilitates generic profile selection or custom selection based on the network device manufacturer (e.g., OEM 102) as well. This facilitates the techniques described herein to be applied for various network device manufacturers.

Once an ownership voucher 114 is received by the user's admin 106 for example via sZTP, via command line, or via universal serial bus (USB), the Security ProfileSelector may be checked and this may facilitate generating a SecurityProfile Config register 118 that may reside in the TAM. In configurations, the SecurityProfile Config register 118 that may reside elsewhere in the network device 108.

Each bit string may facilitate enabling the respective feature or disabling the respective feature depending on the meaning the bit string conveys. The config register 118 may be cleared by the secure process as described herein using ownership vouchers 114, 114*a* with the bit string extension.

The OEM 102 may leverage the functionality of the ownership voucher 114 with the bit string extension to set a default profile before shipping a given network device 108. The user 104 may choose whether the OEM 102 will provide network devices 108 with such a security profile in the future. By extending the ownership voucher 114 to include the bit strings, the user may pick and choose a security profile while enabling sZTP, as well as while getting an ownership voucher from OEM 102 and/or the MASA 112. This facilitates configuring network devices 108 as per the security needs for a given user, e.g., the user 104.

The Security Profile config register 118 in the TAM may be protected once the user 104 starts using the User-database as one cannot change the config register 118 in the TAM until it is signed via a manufactured rooted key or via an owner certificate post ownership transfer. Even finite control of the security profile for the network device 108 in the Security Profile config register 118 may be done after the issuance of the ownership voucher 114 by the OEM 102. Also, in configurations, the user 104 may choose to alter the security profile of the network device 108 by obtaining the new ownership voucher 114*a* with an appropriate new bit string at a later point in time to control the SecurityProfile config and then reboot the network device 108 after receipt of the new ownership voucher 114*a* to alter a current security profile of the network device 108. The config register 118 may be based on an admin object or equivalent that may be read from a basic input output system (BIOS) in some form and may be leveraged in BIOS for various security enforcement.

Thus, the user 104 may use the ownership vouchers 114, 114*a* to clear or reconfigure the security profile of the network device 108. The user may do do this, based on, for example, new and/or security requirements, different security requirements for different operational teams or business units within the user's organization, different security requirements within different geographic regions, change of ownership of the network device 108. This may be done via the following security Selector example (the example shows a yang model representation on how the data may be represented):

```
yang-data voucher-artifact:
  +---- Security Selector
      +---- created-on              yang: date-and-time
      +---- expires-on?             yang: date-and-time
      +---- assertion               enumeration
      +---- serial-number           string
      +---- idevid-issuer?          binary
      +---- Security ProfileSelector  Bit String
      +---- nonce?                  binary
```

The above example is a sZTP example of an ownership certificate (e.g., ownership voucher 114)—signed artifact giving the user 104 the full ownership and control of the Security Profile for the network device 108. Once the user 104 owns the network device 108, the user 104 may use ownership certificate 114 to manage the profile of the network device 108. Thus, the user 104 may avoid a dependency on the manufacturer of the network device 108 post the initial ownership transfer of the network device 108 to the user 104. For example, Yang representation may be used to manage the profile of the network device 108 using the ownership certificate 114 once the owner owns the network device 108. Thus, the entire data may be signed using the ownership certificate 114 and the network device 108 will honor and accept the same. Note that, in configurations, this mechanism may be supported via, for example, Golden-ISO, USB, ZTP, command line interface (CLI), etc., as well.

In configurations, for RMA security cases, the fear is that a new network device 108 may not be properly configured with the user's desired security profile. In this case, the user 104 may do the following: Use of factory reset or equivalent CLI to remove the current security profile of the network device 108 and restore defaults set by the OEM 102. This may be done, for example, using a consent token of the OEM 102 or via a consent token of the user 104 key that may be provisioned via a key-package post claiming ownership of the new network device 108.

Examples of bit strings that may be altered as described herein include, but are not limited to SignedThirpartyRPM. OwnershipTransferEnable, Enable AntiTheft, IMA Third-party Disable, IMAThirdpary Logging. SELinuxPolicy Enforce, Allow Only SecureProtocol, ConfigPCRExtend, CustomModeEnable, EnableFipsMode, DisableDiskEncryption, Disk EcryptionComposite, TrustedPath RoutineEnable, EnableUnMediatedTransfer, EnableMediatedTransfer, TPMControl. and ImplicitAttestationEnable. While this list of non-limiting examples of bit strings that may be altered as described herein are related to security, it should be noted that bit strings related to non-security parameters may also be altered as described herein.

In example configurations, index 1 of the Security Profile config register 118 may include a SignedThirparty RPM bit. If this bit is enabled then the network device 108 does not accept any unsigned Thirparty-RPM. This facilitates securing the network device 108 to accept only a RPM file that is digitally signed using a user Gnu privacy guard (GPG) private key. This works only if the private key is imported to the network device 108 using the keypackage or whatever other method that the network device 108 supports.

In example configurations, index 2 of the Security Profile config register 118 may include an OwnershipTransferEnable bit. This bit facilitates a user transfering the ownership of a network device to a different user. As previously noted, sometimes a network device's ownership initially lies with a third-party or it may be managed by a third-party at a later stage and this bit facilitates enabling ownership transfer of that specific network device.

In example configurations, index 3 of the Security Profile config register 118 may include an EnableAntiTheft bit. This bit facilitates a user enabling AntiTheft. By doing so one will not be able to reset the password as well as downgrade or upgrade an image, BIOS, etc., via a network or via a USB device. This facilitates protecting the network device 108 from various downgrade attacks and a config deletion using re-image once an attacker get physical access to a given network device.

In example configurations, index 4 of the Security Profile config register 118 may include an IMAThirdparty Disable bit. This bit facilitates a user modifying the scripts, etc. such that inverse multiplexing over asynchronous transmission mode (ATM) (IMA) will not enforce the security check. This facilitates scripts that will be frequently changing once the scripts have been brought in to a specific network device via RPM or non RPM way.

In example configurations, index 5 of the Security Profile config register 118 may include an IMAThirdparty Logging bit. This bit facilitates a user enabling IMA logging for third-party apps/scripts so that IMA will enable logging only and will not enforce the security check for the third-party app and scripts.

In example configurations, index 6 of the Security Profile config register 118 may include a SELinuxPolicy Enforce bit. This bit enables the default security enhanced (SE)—Linux policy for third-party RPMs/scripts on a given device.

In example configurations, index 7 of the Security Profile config register 118 may include an Allow OnlySecureProtocol bit. This bit facilitates enabling only secure protocols on the given network device. If anyone tries to configure telnet or other non-secure management protocols, then it will not be allowed even if ons has admin privilege access. Console exceptions may be applicable for telnet.

In example configurations, index 8 of the SecurityProfile config register 118 may include a ConfigPCRExtend bit. This bit facilitates enabling config based hash extension when there is a change in config on a specific network device. This facilitates a user querying via dossier or equivalent infra to cross verify the change went in the config over a period of time and match against the platform configuration register (PCR) value from the given network device.

In example configurations, index 9 of the Security Profile config register 118 may include a CustomModeEnable bit. This bit facilitates a user moving the Aikido mode to setup mode which will facilitate processing the user keys to the user database (db) and this will facilitate provisioning new keys and can act as transition.

In example configurations, index 10 of the Security Profile config register 118 may include an EnableFipsMode bit. This bit facilitates transitioning a given network device to federal information processing standard FIPS mode without configuring via CLI. This facilitates enhanced security for the network device and affects all secure protocol to adhere to this mode and enhance the security posture of the given network device. Certain ciphers, MAC algorithms may be disabled in FIPS mode that are not satisfying the FIPS requirement.

In example configurations, index 11 of the Security Profile config register 118 may include a DisableDiskEncryption bit. This bit may be enabled by default disk encryption on a given network device. If a use does not want to enable disk encryption, then the user may opt for the same. This is mutually exclusive with "DiskEcnryptionComposite" and the latter will take priority if that bit is also mentioned in the bit string selector.

In example configurations, index 12 of the Security Profile config register 118 may include a DiskEcnryptionComposite bit. Disk encryption composite facilitates encrypting and decrypting the disk with a composite key. Part of the key comes from the trusted platform module (TPM) and another one comes from network or other means that can help in encrypting a specific partition in disk or the whole disk.

In example configurations, index 13 of the Security Profile config register 118 may include a TrustedPathRoutineEnable bit. This bit facilitates enabling a trusted path routine on a given device.

In example configurations, index 14 of the Security Profile config register 118 may include an EnableUnMediatedTransfer bit. This bit enables un-mediated transfer of network device ownership from one vendor (e.g., $3^{rd}$ party partner) to another who might be managing the network device at a later point of time thereby post claiming the ownership of the given network device.

In example configurations, index 15 of the Security Profile config register 118 may include an EnableMediatedTransfer bit. This bit enables mediated transfer of network device ownership from one vendor (e.g., $3^{rd}$ party partner) to another who might be managing the network device at a later point of time thereby post claiming the ownership of the given network device.

In example configurations, index 16 of the Security Profile config register 118 may include a TPMControl bit. This bit may be expanded in the future to enable finite control on the TPM chipset feature posture on a given network device.

In example configurations, index 17 of the Security Profile config register 118 may include an ImplicitAttestationEnable bit. This bit may support implicit attestation on that particular network device.

FIG. 2A schematically illustrates an example flow between the admin 106 of the user 104 and the MASA 112 for obtaining a new ownership voucher 114*a* for the network device 108. At 202, the admin 106 of the user 104 sends a template 116 that includes information for the network device 108 to the MASA 112. The template 116 is sent to request the new ownership voucher 114*a* that includes the appropriate security profile for the network device 108. The information may include one or more of a product identification (PID), serial number (SN), a personal digital certificate (PDC) and other fields related to the network device 108. At 204, based on the information, the MASA 112 verifies the ownership of the network device 108, e.g., that the user 104 owns the network device 108. At 206, the MASA 112 may then issue a new ownership voucher 114*a* with the appropriate SelectSecurity Profile bit string for configuring the security posture of the network device 108. At 208, the MASA 112 sends the new ownership voucher 114a to the admin 106 of the user 104 with the appropriate security profile for the network device 108, e.g., the new ownership voucher 114a includes the appropriate SelectSecurity Profile bit string for configuring the security posture of the network device 108.

In configurations, the template 116 includes the SelectSecurity Profile bit string for a desired security posture for the network device 108. The MASA 112 may use the SelectSecurity Profile bit string in the template 116 to issue an appropriate ownership voucher 114a. Thus, the template 116 may be used to request a new ownership voucher 114a based on changed knob (bit) setting(s), changed ownership, different needs for different network devices for the user 104, etc. The template 116 may only list changed knobs (bits) values or may list all knobs (bits) values including knobs (bits) whose values have not changed. In configurations, the template 116 may be the current ownership voucher 114.

Figure 2B:
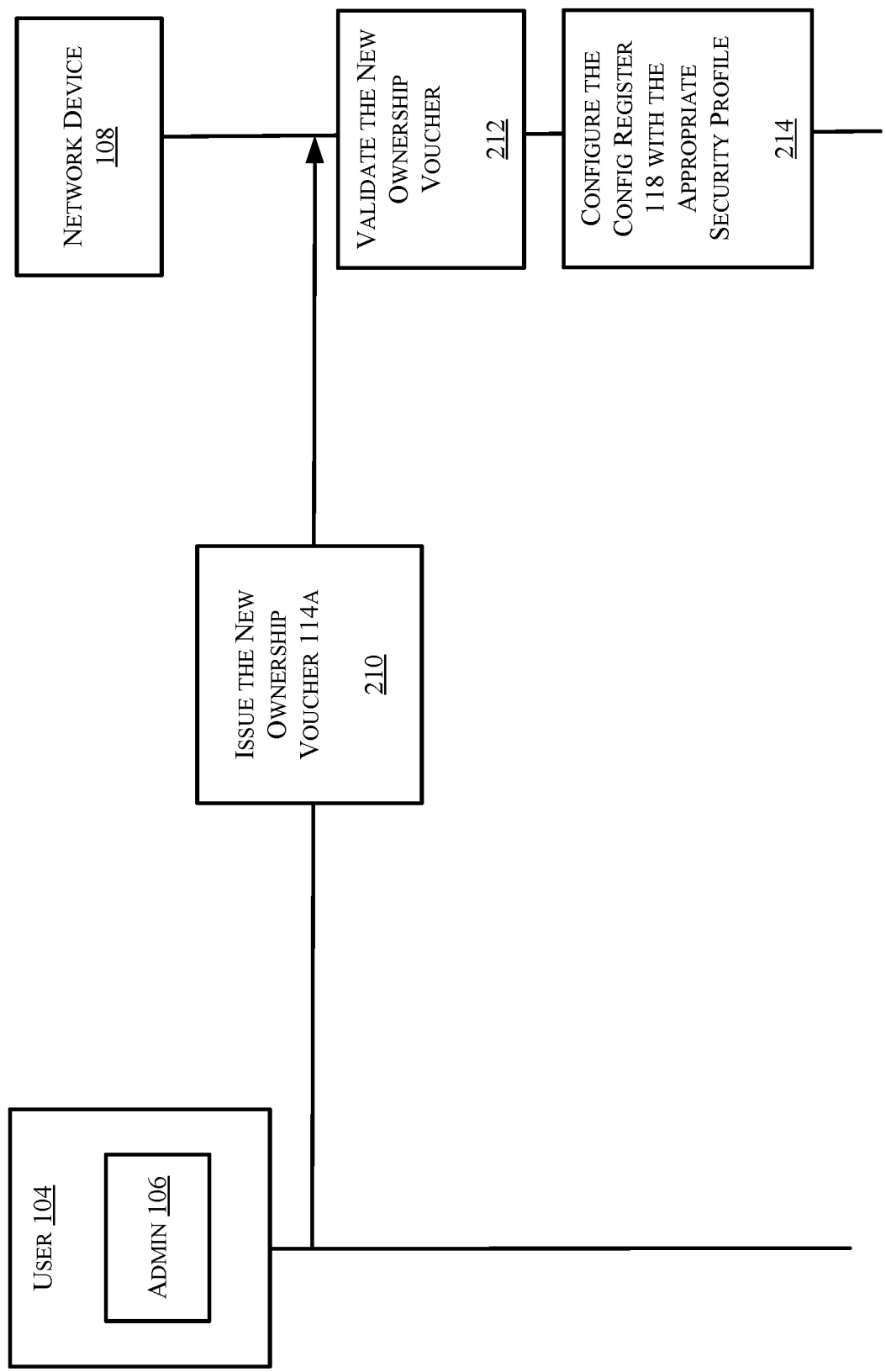
FIG. 2B schematically illustrates an example flow between an admin of the user and the network device.

FIG. 2B schematically illustrates an example flow between the admin 106 of the user 104 and the network device 108. Upon receipt of the new ownership voucher 114a by the admin 106 of the user 104, at 210 the admin 106 of the user 104 issues the new ownership voucher 114a to the network device 108. At 212, the network device 108 validates the new ownership voucher 114a and checks for the Security ProfileSelector bit string. Based on the Security ProfileSelector bit string, at 214 the network device 108 configures its config register 118 in the TAM (or other dedicated register) with the appropriate security profile.

FIG. 3 illustrates a flow diagram of an example method 300 and illustrates aspects of the functions performed at least partly by network devices of a network as described with respect to FIGS. 1, 2A, and 2B. The logical operations described herein with respect to FIG. 3 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 3 illustrates an example method for selecting and configuring security profiles of network devices using a bit string extension within an ownership artifact. In some examples, the method 300 may be performed by a system comprising one or more processors and one or more non-transitory computer-readable media storing computer-executable instructions that, when executed by the one or more processors, cause the one or more processors to perform the method 300.

At 302, a first ownership artifact for a network device is provided to a user. The first ownership artifact includes a first security profile selection bit string extension. Additionally, the first security profile selection bit string extension is configured to configure the network device according to a first security profile. For example, the OEM 102 may provide an ownership voucher 114 to the user 104. The ownership voucher 114 includes the first security profile selection bit string extension that is configured to configure the network device 108 according to a first security profile.

At 304, a request for a second ownership artifact is received from the user. The request includes a request for a second security profile selection bit string extension within the second ownership artifact. For example, the OEM 102 may receive a request from the user 104 for a new ownership voucher 114a. The request indicates that new ownership voucher 114a needs to include the second security profile selection bit string extension that is configured to configure the network device 108 according to a second security profile. In configurations, the request is in the form of template 116. In configurations, the template 116 includes the first ownership voucher 114.

At 306, the second ownership artifact is provided to the user. The second ownership artifact comprises the second security profile selection bit string extension. Additionally, the second security profile selection bit string extension is configured to configure the network device according to a second security profile. For example, the OEM 102 may provide a new ownership voucher 114a to the user 104. In configurations, the MASA 112 issues the new ownership voucher 114a. The new ownership voucher 114a includes the second security profile selection bit string extension that is configured to configure the network device 108 according to the second security profile.

Thus, the present disclosure provides techniques and architecture for facilitating a user securely customizing the "(semi-) permanent" security posture of a given network device, which may be done during "first boot" e.g. through sZTP as the mechanism extends the OV/OC from the sZTP RFC. This is highly desirable by users, especially when this needs to happen at mass scale (zero touch securely tailoring the security profile of a node of a network, e.g., a network device). The techniques and architecture facilitate security profile selection being carried in an ownership voucher that will facilitate a security profile for a particular network device. This gives control for users as well as OEMs manufacturing in enabling/disabling specific security features (in TAM). The techniques and architecture may be expanded in the future to control many features that may be explicitly enabled with the help of OVs/OCs that are outside the scope of security. The techniques and architecture facilitate ease of management of security posture per network device. The techniques and architecture reduce the overall cost in managing the network device by having a single source of control on enabling security of the network device. The techniques and architecture reduce the time a network device spends in manufacturing to enable certain features that are tied to TPM.

Figure 4:
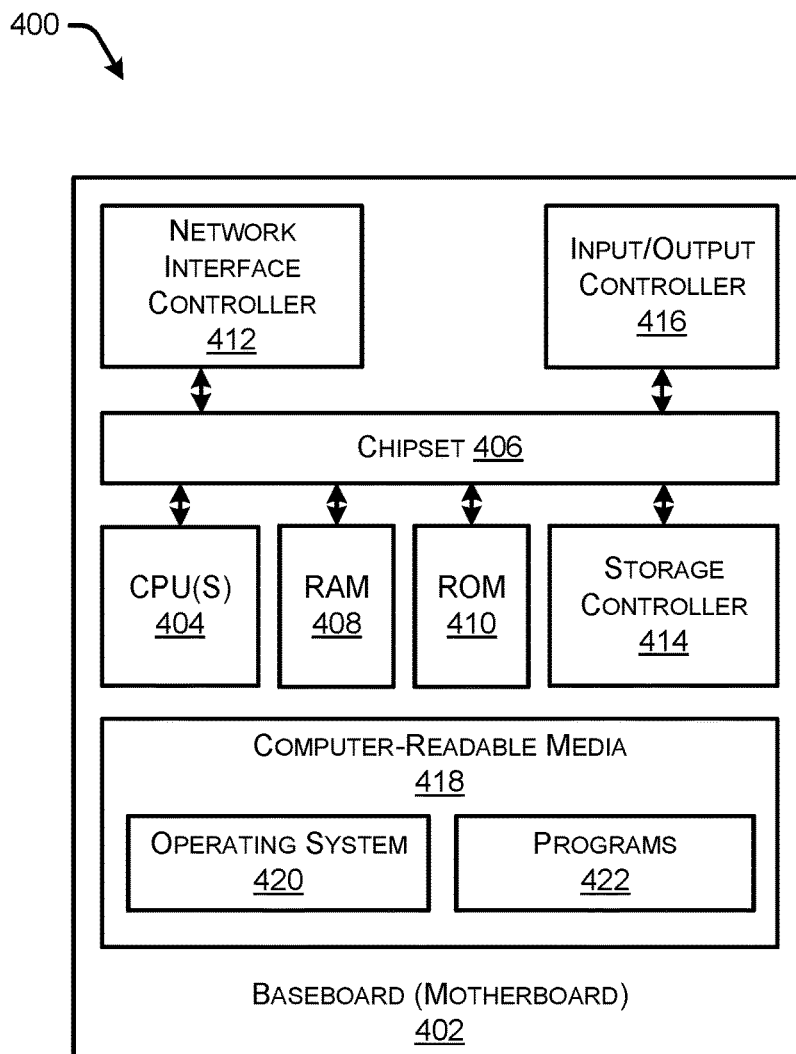
FIG. 4 is a computer architecture diagram showing an example computer hardware architecture for implementing a device that can be utilized to implement aspects of the various technologies presented herein.

FIG. 4 shows an example computer architecture for a computing device 400 capable of executing program components for implementing the functionality described above. In configurations, one or more of the computing devices 400 may be used to implement one or more of the components of FIGS. 1-3. The computer architecture shown in FIG. 4 illustrates a conventional server computer, workstation, desktop computer, laptop, tablet, network appliance, e-reader, smartphone, or other computing device, and can be utilized to execute any of the software components presented herein. The computing device 400 may, in some examples, correspond to a physical device or resources described herein.

The computing device 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computing device 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computing device 400. The chipset 406 can further provide an interface to a computer-readable storage medium such as a read-only memory ("ROM") 410 or non-volatile RAM ("NVRAM") for storing basic routines that help to startup the computing device 400 and to transfer information between the various components and devices. The ROM 410 or NVRAM can also store other software components necessary for the operation of the computing device 400 in accordance with the configurations described herein.

The computing device 400 can operate in a networked environment using logical connections to remote computing devices and computer systems through a network, such as the arrangement 100. The chipset 406 can include functionality for providing network connectivity through a NIC 412, such as a gigabit Ethernet adapter. In configurations, the NIC 412 a smart NIC (based on data processing units (DPUs)) that can be plugged into data center servers to provide networking capability. The NIC 412 is capable of connecting the computing device 400 to other computing devices over the networks of the arrangement 100. It should be appreciated that multiple NICs 412 can be present in the computing device 400, connecting the computer to other types of networks and remote computer systems.

The computing device 400 can be connected to a storage device 418 that provides non-volatile storage for the computer. The storage device 418 can store an operating system 420, programs 422, and data, which have been described in greater detail herein. The storage device 418 can be connected to the computing device 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computing device 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 400 can further read information from the storage device 418 by detecting the physical states or characteristics of one or more particular locations within the physical storage units.

In addition to the mass storage device 418 described above, the computing device 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 400. In some examples, the operations performed by the cloud network, and or any components included therein, may be supported by one or more devices similar to computing device 400. Stated otherwise, some or all of the operations described herein may be performed by one or more computing devices 400 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computing device 400. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 418 can store other system or application programs and data utilized by the computing device 400.

In one embodiment, the storage device 418 or other computer-readable storage media is encoded with computer-executable instructions which, when loaded into the computing device 400, transform the computer from a generalpurpose computing system into a special-purpose computer capable of implementing the embodiments described herein. These computer-executable instructions transform the computing device 400 by specifying how the CPUs 404 transition between states, as described above. According to one embodiment, the computing device 400 has access to computer-readable storage media storing computer-executable instructions which, when executed by the computing device 400, perform the various processes described above with regard to FIGS. 1-3. The computing device 400 can also include computer-readable storage media having instructions stored thereupon for performing any of the other computer-implemented operations described herein.

The computing device 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computing device 400 might not include all of the components shown in FIG. 4, can include other components that are not explicitly shown in FIG. 4, or might utilize an architecture completely different than that shown in FIG. 4.

The computing device 400 may support a virtualization layer, such as one or more virtual resources executing on the computing device 400. In some examples, the virtualization layer may be supported by a hypervisor that provides one or more virtual machines running on the computing device 400 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   providing, to a user, a first ownership artifact for a network device, wherein the first ownership artifact includes a first security profile selection bit string extension, and wherein the first security profile selection bit string extension is configured to configure the network device according to a first security profile;
   receiving, from the user, a request for second ownership artifact, wherein the request includes a request for a second security profile selection bit string extension within the second ownership artifact; and
   at least in response to the request, providing the second ownership artifact to the user, wherein the second ownership artifact comprises the second security profile selection bit string extension, and wherein the second security profile selection bit string extension is configured to configure the network device according to a second security profile,
   wherein the request lists only values of bits of the second security profile selection bit string extension that need to be changed to configure the network device according to the second security profile.

2. The method of claim 1, wherein the request includes the first ownership artifact.

3. The method of claim 2, further comprising:
   based at least in part on the first ownership artifact, verifying, via a manufacturer authorized signing authority (MASA) mechanism, ownership by the user of the network device.

4. The method of claim 1, wherein the request includes a request for a non-security profile selection bit string extension within the second ownership artifact.

5. The method of claim 1, wherein the request for the second ownership artifact is signed by the user using the first ownership artifact.

6. The method of claim 5, wherein a manufacturer authorized signing authority (MASA) mechanism is part of an original equipment manufacturer (OEM) that manufactured the network device.

7. The method of claim 1, wherein the request for the second ownership artifact is based at least in part on one or more of (i) a change of ownership of the network device, (ii) different security requirements for different operational teams or business units within the user, (iii) different security requirements for different geographical regions, or (iv) new security requirements for the user.

8. A system comprising:
   one or more processors; and
   one or more non-transitory computer-readable media storing computer-executable instructions that, when executed by the one or more processors, cause the one or more processors to perform actions comprising:
      providing, to a user, a first ownership artifact for a network device, wherein the first ownership artifact includes first security profile selection bit string extension, and wherein the first security profile selection bit string extension is configured to configure the network device according to a first security profile;
      receiving, from the user, a request for a second ownership artifact, wherein the request includes a request for a second security profile selection bit string extension within the second ownership artifact; and
      at least in response to the request, providing the second ownership artifact to the user, wherein the second ownership artifact comprises the second security profile selection bit string extension, and wherein the second security profile selection bit string extension is configured to configure the network device according to a second security profile,
      wherein the request lists only values of bits of the second security profile selection bit string extension that need to be changed to configure the network device according to the second security profile.

9. The system of claim 8, wherein the request includes the first ownership artifact.

10. The system of claim 9, wherein the actions further comprise:
    based at least in part on the first ownership artifact, verifying, via a manufacturer authorized signing authority (MASA) mechanism, ownership by the user of the network device.

11. The system of claim 8, wherein the request includes a request for a non-security profile selection bit string extension within the second ownership artifact.

12. The system of claim 8, wherein the request for the second ownership artifact is signed by the user using the first ownership artifact.

13. The system of claim 12, wherein a manufacturer authorized signing authority (MASA) mechanism the MASA mechanism is part of an original equipment manufacturer (OEM) that manufactured the network device.

14. The system of claim 8, wherein the request for the second ownership artifact is based at least in part on one or more of (i) a change of ownership of the network device, (ii) different security requirements for different operational teams or business units within the user, (iii) different security requirements for different geographical regions, or (iv) new security requirements for the user.

15. One or more non-transitory computer-readable media storing computer-executable instructions that, when executed by one or more processors, cause the one or more processors to perform actions comprising:
    providing, to a user, a first ownership artifact for a network device, wherein the first ownership artifact includes first security profile selection bit string extension, and wherein the first security profile selection bit string extension is configured to configure the network device according to a first security profile;
    receiving, from the user, a request for a second ownership artifact, wherein the request includes a request for a second security profile selection bit string extension within the second ownership artifact; and
    at least in response to the request, providing the second ownership artifact to the user, wherein the second ownership artifact comprises the second security profile selection bit string extension, and wherein the second security profile selection bit string extension is configured to configure the network device according to a second security profile,
    wherein the request lists only values of bits of the second security profile selection bit string extension that need to be changed to configure the network device according to the second security profile.

16. The one or more non-transitory computer-readable media storing computer-executable instructions of claim 15, wherein:
    the request includes the first ownership artifact; and
    the actions further comprise:
    based at least in part on the first ownership artifact, verifying, via a manufacturer authorized signing authority (MASA) mechanism, ownership by the user of the network device.

17. The one or more non-transitory computer-readable media storing computer-executable instructions of claim 15, wherein:
    the request for the second ownership artifact is signed by the user using the first ownership artifact; and
    a manufacturer authorized signing authority (MASA) mechanism is part of an original equipment manufacturer (OEM) that manufactured the network device.

18. The one or more non-transitory computer-readable media storing computer-executable instructions of claim 15, wherein the request for the second ownership artifact is based at least in part on one or more of (i) a change of ownership of the network device, (ii) different security requirements for different operational teams or business units within the user, (iii) different security requirements for different geographical regions, or (iv) new security requirements for the user.

19. A method comprising:
    providing, to a user, a first ownership artifact for a network device, wherein the first ownership artifact includes a first security profile selection bit string extension, and wherein the first security profile selection bit string extension is configured to configure the network device according to a first security profile;
    receiving, from the user, a request for a second ownership artifact, wherein the request includes a request for a second security profile selection bit string extension within the second ownership artifact; and
    at least in response to the request, providing the second ownership artifact to the user, wherein the second ownership artifact comprises the second security profile selection bit string extension, and wherein the second security profile selection bit string extension is configured to configure the network device according to a second security profile,
    wherein the request lists (i) values of bits of the second security profile selection bit string extension that need to be changed to configure the network device according to the second security profile and (ii) current values of bits of the first security profile selection bit string extension that are to remain unchanged to configure the network device according to the second security profile.

20. A system comprising:
one or more processors; and
one or more non-transitory computer-readable media storing computer-executable instructions that, when executed by the one or more processors, cause the one or more processors to perform actions comprising:
    providing, to a user, a first ownership artifact for a network device, wherein the first ownership artifact includes first security profile selection bit string extension, and wherein the first security profile selection bit string extension is configured to configure the network device according to a first security profile;
    receiving, from the user, a request for a second ownership artifact, wherein the request includes a request for a second security profile selection bit string extension within the second ownership artifact; and
    at least in response to the request, providing the second ownership artifact to the user, wherein the second ownership artifact comprises the second security profile selection bit string extension, and wherein the second security profile selection bit string extension is configured to configure the network device according to a second security profile, and
    wherein the request lists (i) values of bits of the second security profile selection bit string extension that need to be changed to configure the network device according to the second security profile and (ii) current values of bits of the first security profile selection bit string extension that are to remain unchanged to configure the network device according to the second security profile.

* * * * *